United States Patent
Bolduc et al.

(10) Patent No.: US 7,699,133 B2
(45) Date of Patent: Apr. 20, 2010

(54) THROTTLE DISABLE METHOD AND SYSTEM

(75) Inventors: Timothy D. Bolduc, Westfield, IN (US); Christopher A. Hedges, Greentown, IN (US); Luis A. Prieto, Noblesville, IN (US); R. Clarkson Griffin, Carmel, IN (US); Gerald P. Hunt, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 6 days.

(21) Appl. No.: 12/229,712

(22) Filed: Aug. 26, 2008

(65) Prior Publication Data

US 2008/0314673 A1 Dec. 25, 2008

Related U.S. Application Data

(62) Division of application No. 10/779,935, filed on Feb. 17, 2004, now Pat. No. 7,434,649.

(51) Int. Cl.
*B60K 28/10* (2006.01)
(52) U.S. Cl. .................. 180/279; 180/284; 701/84; 701/85
(58) Field of Classification Search ............... 180/277, 180/279, 284; 701/84, 85
See application file for complete search history.

(56) References Cited

U.S. PATENT DOCUMENTS

| | | | |
|---|---|---|---|
| 4,300,205 A | 11/1981 | Tansuwan | |
| 4,505,169 A | 3/1985 | Ganoung | |
| 4,638,224 A * | 1/1987 | Gritter | 318/400.37 |
| 4,665,319 A | 5/1987 | Seepe et al. | |
| 5,224,044 A | 6/1993 | Tamura et al. | |
| 5,255,192 A * | 10/1993 | Ito et al. | 701/90 |
| 5,321,980 A | 6/1994 | Hering et al. | |
| 5,445,126 A | 8/1995 | Graves, Jr. | |
| 5,575,255 A | 11/1996 | Abe et al. | |
| 5,828,297 A | 10/1998 | Banks et al. | |
| 5,902,211 A | 5/1999 | Jones et al. | |
| 5,957,991 A | 9/1999 | Yasuda | |

(Continued)

FOREIGN PATENT DOCUMENTS

WO 03/044632 5/2003

OTHER PUBLICATIONS

European Search Report Dated Jun. 1, 2005.

(Continued)

*Primary Examiner*—Toan C To
(74) *Attorney, Agent, or Firm*—Jimmy L. Funke

(57) ABSTRACT

The present invention provides a system and method for degrading and disabling a vehicle's engine throttle. The vehicle disable system includes a throttle position sensor that generates a throttle position signal, an electronic control module ("ECM") input connected to the ECM on which the throttle position sensor provides the throttle position signal to the ECM, and an override input that enables an idling signal to be transmitted to the ECM instead of the throttle position signal. The method of the present invention includes the steps of receiving an input signal related to the state of the driver input mechanism, interpreting the input signal, and at least one of degrading and disabling the throttle based on the interpretation of the input signal.

30 Claims, 8 Drawing Sheets

U.S. PATENT DOCUMENTS

| | | |
|---|---|---|
| 6,060,981 A | 5/2000 | Landes |
| 6,619,258 B2 | 9/2003 | McKay et al. |
| 6,701,897 B2 | 3/2004 | Chatfield |
| 6,931,315 B2 | 8/2005 | Ayabe et al. |
| 6,942,598 B2 | 9/2005 | Kondo et al. |
| RE39,137 E * | 6/2006 | Kamura et al. ............. 123/295 |
| 2003/0000500 A1 * | 1/2003 | Chatfield ................... 123/438 |
| 2003/0169161 A1 | 9/2003 | Brown et al. |

OTHER PUBLICATIONS

European Search Report Dated Aug. 16, 2005.

* cited by examiner

THROTTLE DISABLE METHOD AND SYSTEM

CROSS-REFERENCE TO RELATED APPLICATIONS

This application is a division of U.S. patent application Ser. No. 10/779,935, filed Feb. 17, 2004 now U.S. Pat. No. 7,434,649 which claims the benefit of U.S. patent application Ser. No. 10/345,070, filed Jan. 15, 2003, entitled "Vehicle Disable System."

TECHNICAL BACKGROUND

The present invention generally relates to security systems and more particularly relates to systems for disabling the movement of a vehicle.

BACKGROUND OF THE INVENTION

Existing vehicle security systems are primarily autonomous systems used to detect theft or vandalization of a vehicle, vehicle components, or unauthorized vehicle entry. In view of recent homeland security issues, however, protecting vehicles against theft or vandalism has become secondary, giving way to a primary concern of protecting citizens from vehicles that could possibly be used for mass destruction of property or human life. Vehicle disabling systems have been developed to disable a vehicle in a controlled manner, thereby allowing the vehicle's operator, at all times, to maintain control of the vehicle.

There are currently several vehicle security and/or vehicle tracking systems that can disable a vehicle's engine. Most systems utilize either electrical or mechanical means and are designed to prevent the vehicle's engine from either starting or running. The most common form of security systems use an automotive relay to inhibit either the starter, ignition, engine controller, or fuel pump. Such cutting of electrical power to parts of the vehicle creates a dangerous situation because it may result in an abrupt loss of propulsion and power steering. Systems that cut electrical power can make the disabling of a car hazardous and the disabling of a large truck extremely dangerous.

SUMMARY OF THE INVENTION

The present invention provides a method and system for degrading and disabling a vehicle's engine throttle response in a safe manner.

The present invention provides several advantages. One advantage of the present invention is that the method and system idles the throttle by reducing the power and not entirely cutting the power provided by the engine. Accordingly, the vehicle's driver is still able to control the throttle with reduced power without losing control of the vehicle's steering device and other engine-enabled mechanisms such as power brakes.

Another advantage provided by the present invention is that the method and system is capable of idling the throttle of a vehicle driven by either the vehicle's regular driver or the vehicle's hijacker, without a distinction being first made between the two. The multistage disable method provides a way to slow down the vehicle to prevent the hijacker's escape (or the hijacker's use of the vehicle in an act of terrorism) while also providing for the safety of the vehicle's regular driver in the event that the driver is off course.

In an automotive vehicle having an engine throttle under the control of an electronic control module ("ECM"), the ECM including an ECM input adapted to be connected to the ECM, the present invention provides a method of forcing the throttle to idle, the method including the steps of providing a vehicle disable system including a throttle position sensor; a throttle position signal line and an alternative signal line, both of the lines capable of being connected to the ECM input, the throttle position signal line including a switch to disconnect the throttle position signal line from the ECM input and connect said alternative signal line to the ECM input when switch means is activated; activating the switch; and transmitting an idling signal to the ECM on the ECM input to effect the idling of the throttle.

In another form of the present invention, a vehicle disable system is provided, the system including a throttle position sensor having a driver input mechanism, the driver input mechanism indicating a state of the engine throttle varying between idle operation and non-idle operation, and the throttle position sensor also generating a throttle position signal related to the state of the driver input mechanism; an ECM input adapted to be connected to the ECM, the throttle position sensor providing the throttle position signal to the ECM on the ECM input; and an override input that enables an idling signal to be transmitted to the ECM on the ECM input in lieu of said throttle position signal.

In still another form of the present invention, a method of reducing the throttle is provided, the method including the steps of receiving an input signal related to the state of the driver input mechanism, interpreting the input signal; and at least one of degrading and disabling the throttle based on the interpretation of the input signal.

In yet another form of the present invention, a controller is provided, the controller including a processor and memory readable by the processor, the memory storing program instructions executable by the processor to perform the steps of receiving an input signal related to the state of the driver input mechanism; interpreting the input signal; and at least one of degrading and disabling the throttle based on the interpretation of the input signal.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
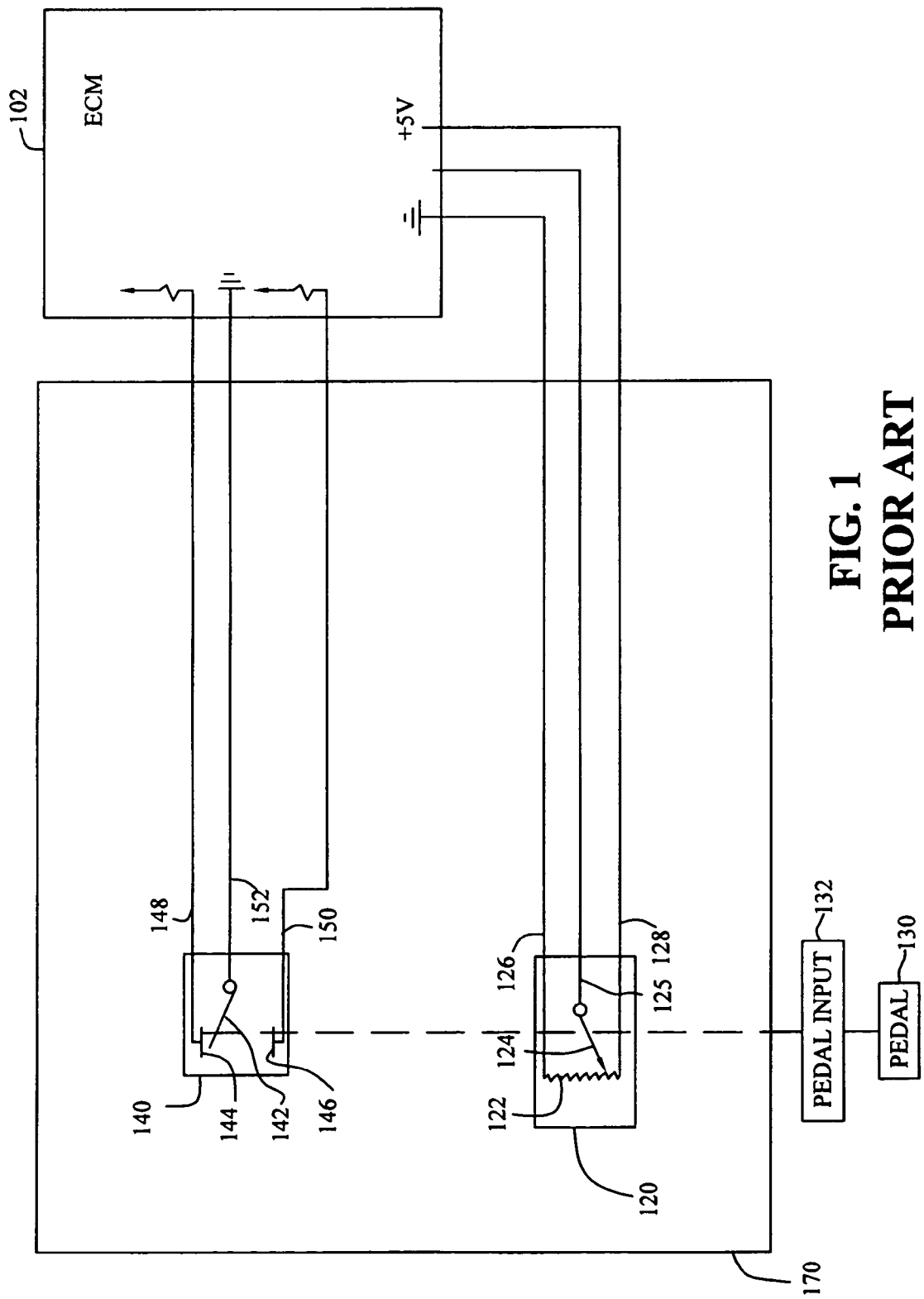
FIG. 1 is a schematic diagram of a prior art throttle position sensor assembly.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Some vehicle tracking systems include virtual security devices that enable vehicles to be tracked during travel. Using global positioning system (GPS) technology, such devices can determine the exact location of a vehicle at any given time. These virtual security devices are also capable of creating geographic barriers that may be used to specify 1) a route that a vehicle should or should not be following; and 2) a prohibited geographic location which a vehicle should not approach. These graphic barriers often use the concept of "zones" to delineate the geographic boundaries. For example, a "green" zone may be defined to indicate the route which a vehicle is expected to follow. A "yellow" zone may be defined to indicate that the vehicle is either getting too close to a prohibited location or too far from its specified route. A "red" zone may be defined to indicate that the vehicle is either dangerously close to a prohibited location or extremely far from its specified route.

The present invention provides a vehicle disable system and method that is capable of degrading and disabling an engine throttle. The use of the term "degrade" hereinafter refers to reducing the throttle without idling it, and "disable" hereinafter refers to idling the throttle. In most vehicles, the engine throttle is controlled by the electronic control module ("ECM"), as shown in FIG. 1. ECM 102 is a microprocessor that receives electronic inputs from sensors and switches, and it provides a reference voltage for some sensors, including throttle position sensor ("TPS") 120. TPS 120 typically is a potentiometer that senses the position of the vehicle's accelerator pedal 130. The potentiometer of TPS 120 includes potentiometer 122, which provides a resistance, and wiper arm 124. Wiper arm 124 is in contact with and positioned along potentiometer 122 by pedal input 132 in accordance with the position of accelerator pedal 130. Accelerator pedal 130 is capable of both accelerating an engine and decelerating an engine to an idle state. Wiper arm 124 is connected to pedal 130 either by mechanical or electrical means. Potentiometer 122 is connected between lines 126, 128, and wiper arm 124 is connected to line 125. Line 126 is referenced to ground. Lines 125, 126, 128 are connected to ECM 102. TPS 120 is operated by pedal input 134 to determine position of pedal 130 from idle to full-throttle positions. Alternatively, TPS 120 may be implemented as an optical encoder, a variable magnetic inductance, a variable capacitance or a variable conductance.

As shown in FIG. 1, ECM 102 provides a five (5) volt potential to TPS 120 via line 128. The voltage drop apparent to ECM 102 depends on the position of accelerator pedal 130. The voltage is applied across potentiometer 122, and wiper arm 124 picks up the voltage drop (referred to hereinafter as the throttle position signal) and provides it via line 125 to ECM 102 as an input. Consequently, the throttle position signal indicates the position of accelerator pedal 130, and as the angle of pedal 130 changes, TPS 120 varies the throttle position signal to ECM 102.

TPS 120 is often included as a part of TPS assembly 170 along with idle validation switch ("IVS") 140. IVS 140 indicates to ECM 102 when accelerator pedal 130 is or is not at the idle position. IVS 140 includes switch 142 and terminals 144, 146. Switch 142 is connected to line 152, terminal 144 is connected to validation signal line 148, and terminal 146 is connected to validation signal line 150. Lines 148, 150, 152 are connected to ECM 102. IVS 140 is a two-position switch such that when switch 142 is in contact with terminal 144, IVS 140 indicates an idle position and when switch 142 and terminal 146 are closed, IVS 140 indicates an off-idle position. The function of IVS 140 is to provide a fail-safe in the event that a failure occurs in the throttle wiring or circuits. In such a case, ECM 102 causes the engine throttle to idle.

Figure 2:
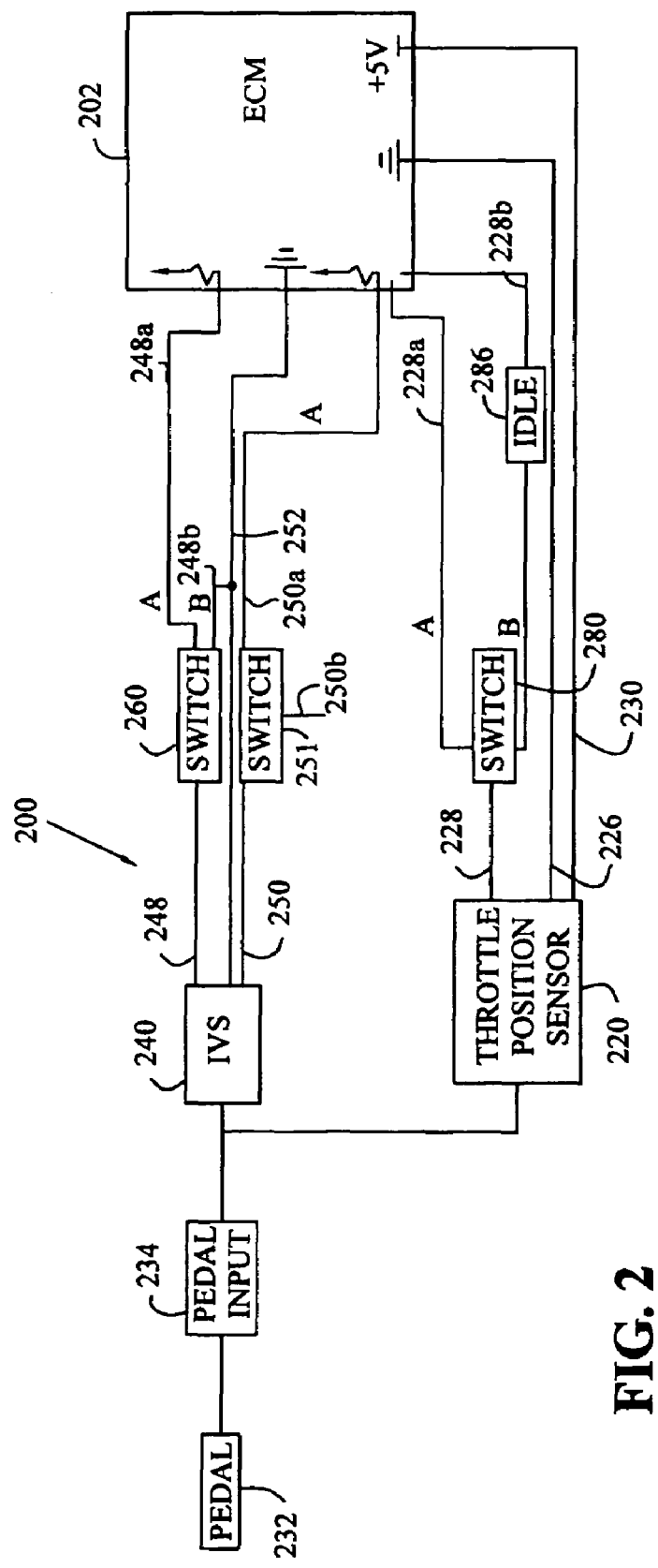
FIG. 2 is a block diagram of the vehicle disable system of the present invention when the throttle is either enabled or disabled.

Shown in FIG. 2 is a block diagram of the vehicle disable system of the present invention when a throttle is either enabled or disabled. Vehicle disable system 200 includes ECM 202, TPS 220 and IVS 240. TPS 220 includes throttle voltage supply line 230, ground line 226 and throttle position signal line 228. Throttle position signal line 228 includes lines 228a, 228b. In the throttle's enabled state A, switch mechanism 280 enables throttle position signal line 228a to connect throttle position sensor 220 to ECM 202. In the throttle's disabled state B, switch mechanism 280 enables throttle position signal line 228 to connect throttle position sensor 220 to idling device 286, and throttle position signal line 228b connects idling mechanism 286 to ECM 202. In an exemplary embodiment of the present invention, idling mechanism 228b includes a potentiometer.

IVS 240 includes validation signal lines 248, 250 and ground line 252. Validation signal line 248 includes lines 248a, 248b. Switch mechanism 260 enables validation signal line 248a to be utilized by the vehicle disable system when the throttle is in its enabled state A, and switch mechanism 260 enables validation signal line 248b to be utilized by the disable system when the throttle is in its disabled state B. Validation signal line 248a connects IVS 240 to ECM 202, and validation signal line 248b connects IVS 240 to ground line 252. Similarly, validation signal line 250 includes lines 250a, 250b. Switch mechanism 251 enables the vehicle disable system to use validation signal line 250a when the throttle is in its enabled state A, and switch 251 enables the vehicle disable system to use validation signal line 250b when the throttle is in its disabled state B. Validation signal line 250 a connects IVS 240 to ECM 202, and validation signal line 250b is open.

As will be described in more detail below, when the throttle is in its enabled state A, the vehicle disable system of the present invention enables TPS 220 to pass unaltered signals to ECM 202 via throttle position signal line 228a and enables IVS 240 to pass unaltered signals to ECM 202 on validation signal lines 248a, 250a. However, when the vehicle disable system of the present invention forces the throttle to its disabled state B, throttle position signal line 228 and validation signal line 248 are modified to resemble the idle state of accelerator pedal 232. In disabled state B, TPS 220 and IVS 240 are not able to pass unaltered signals to ECM 202. The throttle position signal passed on throttle position signal line 228 is intercepted by idling mechanism 286, and idling mechanism 286 generates and transmits an idle voltage to ECM 202 on throttle position signal line 228b. The validation signal passed on validation signal line 248 is routed to ground line 252 via validation signal line 248b, and the validation signal passed on validation signal line 250 is opened via validation signal line 250b. These concepts are described below in greater detail in regards to FIGS. 3 and 4.

Figure 3:
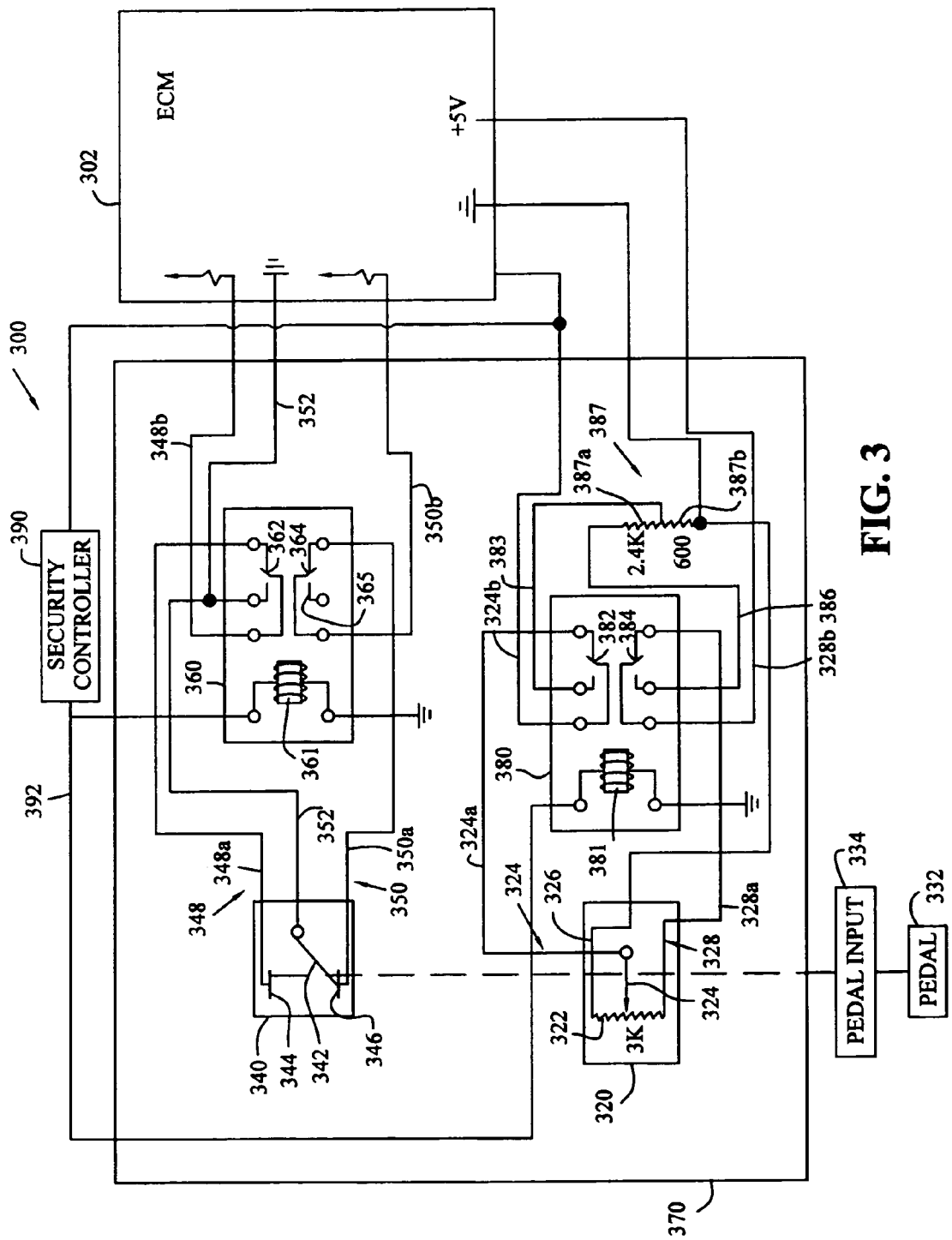
FIG. 3 is a schematic diagram of a specific implementation of the vehicle disable system when the throttle is enabled.

FIG. 3 illustrates vehicle disable system 300 when the throttle is disabled. When a throttle is enabled, the throttle is in a non-idle state, as is pedal 332. Vehicle disable system 300 includes ECM 302, pedal 332, pedal input 334, throttle position sensor assembly 370 and security controller 390. Throttle position sensor assembly 370 includes TPS 320 and IVS 340. TPS 320 includes potentiometer 322 connected to line 326 and voltage supply line 328. ECM 302 provides a voltage potential, in the exemplary embodiment a +5VDC, via voltage supply line 328 to potentiometer 322, in the exemplary embodiment a three (3) kilohm potentiometer. Wiper arm 324 is in contact with potentiometer 322 and is connected to throttle position signal line 324. When pedal 332 is depressed, thereby enabling the throttle, wiper arm 324 sends a throttle position signal to ECM 302 via throttle position signal line 324 that may, in the exemplary embodiment, vary from +1V (idle) to +4V (full throttle).

In an exemplary embodiment of vehicle disable system 300, TPS 320 also includes relay 380. Relay 380 includes coil 381 that becomes energized upon receipt of a signal from security control unit 390 via override input signal line 392. Relay 380 includes switches 382, 384 and is shown in FIG. 3 in an energized state. In this energized state, switches 382, 384 are in a non-idle position. In a non-idle position, switch 382 connects throttle position signal line 324 to ECM 302 by maintaining a connection between first portion 324a and second portion 324b. Second portion 324b serves as an ECM input and is connected to ECM 302. When switch 384 is in a non-idle position, it connects voltage supply line 328 to ECM 302 by maintaining a connection between first portion 328a and second portion 328b. Second portion 328b connects to ECM 302. In other embodiments of the present invention, relay's 380 functionality may be provided by analog circuitry, digital circuitry, and a microprocessor carrying out program instructions.

IVS 340 includes terminal 344 connected to validation signal line 348, terminal 346 connected to validation signal line 350, and switch 342 connected to ground line 352. When pedal 332 is depressed and the throttle is enabled, switch 342 is in communication with terminal 346. IVS 340 also includes relay 360, which has switches 362, 364, both of which are shown in a non-idle position. When pedal 332 is depressed and switches 362, 364 are in a non-idle position, switch 362 connects validation signal line 348 to ECM 202 by maintaining a connection between first portion 348a and second portion 348b. When in a non-idle position, switch 364 connects validation signal line 350 to ECM 302 by maintaining a connection between first portion 350a and second portion 350b. In other embodiments of the present invention, the function of relay 360 also may be provided by analog circuitry, digital circuitry, and a microprocessor carrying out program instructions.

Figure 4:
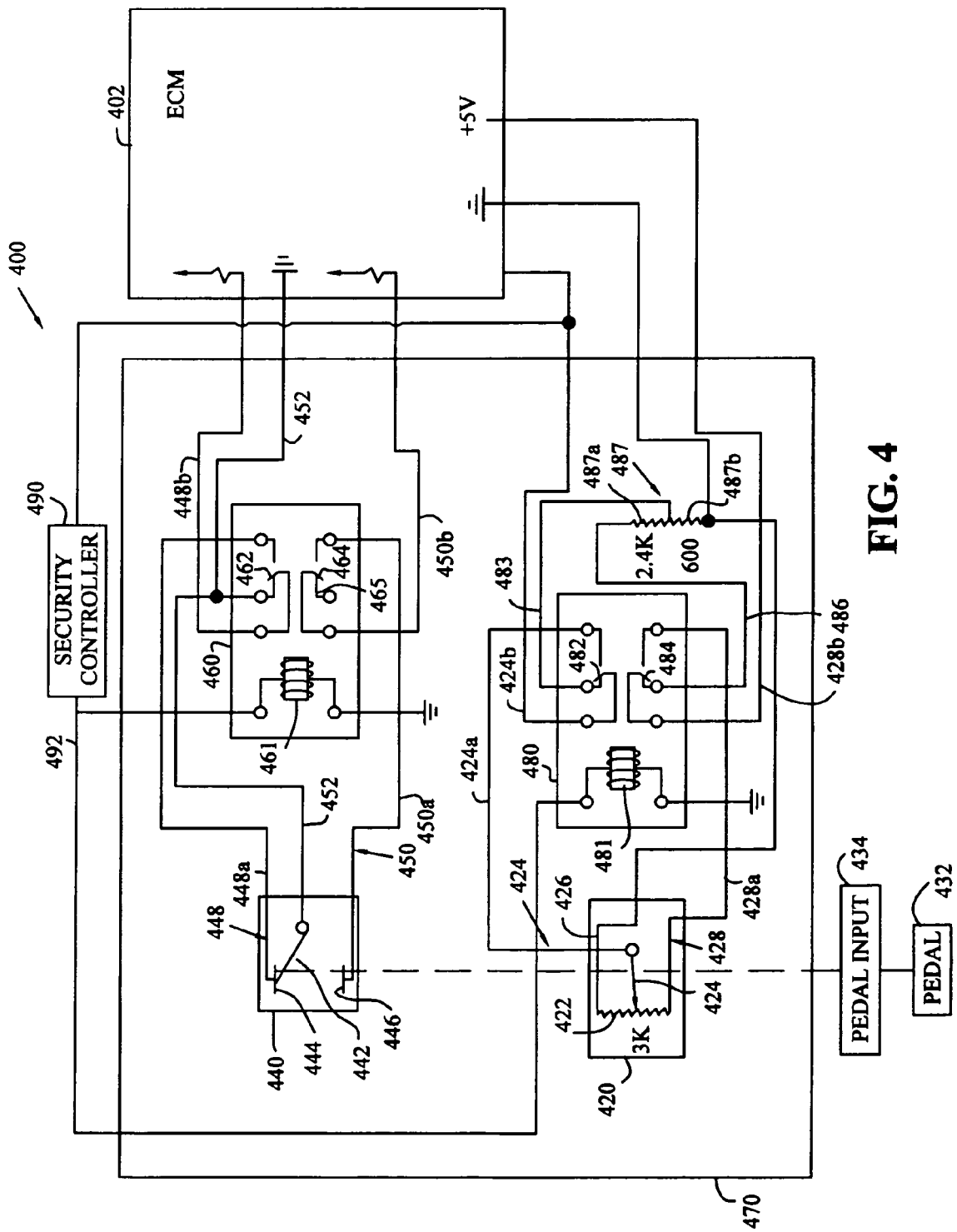
FIG. 4 is a schematic diagram of a specific implementation of the vehicle disable system when the throttle is disabled.

Now referring to FIG. 4, the method of the present invention may be described as implemented in vehicle disable system 400, shown when a throttle is in a disabled state, or idle. If security control unit 490 applies a high voltage on override input line 492, the throttle will be it its enabled state. In order to force the throttle to idle, however, security control unit 490 applies a low voltage to relays 460, 480 via override input line 492. The low voltage provided on input line 492 de-energizes coils 461, 481 and enables switches 462, 464, 482, 484 to move to their idle positions. In moving to its idle position, switch 482 disconnects throttle position signal line 424 from ECM 402. Throttle position signal line first portion 424a is disconnected from throttle position signal line second portion 424b, and switch 482 connects ECM input 424b to alternative throttle position signal line 483. Therefore, the throttle position signal provided by wiper arm 424 to ECM 402 is no longer able to be transmitted to ECM 402.

Switch 484, in its idle position, disconnects voltage supply line 428 from ECM 402 by disconnecting voltage supply line first portion 428a from second voltage supply line second portion 428b and connecting second portion 428b to alternative voltage supply line 486. Alternative voltage supply line 486 includes alternative potentiometer 487. Potentiometer 487 provides a two (2) resistor voltage divider, in the exemplary embodiment including 2.4K resistor 487a and 600K resistor 487b. The two (2) resistor voltage divider is used to provide the alternative voltage supply to ECM 402. Alternative throttle position signal line 483 is in contact with alternative potentiometer 487. After ECM 402 provides a +5V reference voltage across alternative resistor 487 via lines 428b and 486, alternative throttle position signal line 483 is provided with a voltage equal to $V_1 R_2/(R_1+R_2)$, i.e., 5*600K/(3000K), or +1V; thus, providing an idle voltage to ECM 402 and forcing the throttle to an idle state in this exemplary embodiment.

After the idle voltage is provided to ECM 402, IVS 440 verifies to ECM 402 that the throttle is in an idle state. Switch 442 is in communication with terminal 444, which is connected to validation signal line 448. The same low voltage applied by security control unit 490 via override signal line 492 to effect the idle positions of switches 482, 484 of relay 480 also effects the idle positions of switches 462, 464. In its idle position, switch 462 disconnects validation signal line 448 from ECM 402 and connects validation signal line second portion 448b to ground line 452. Energized switch 464 disconnects validation signal line 450 from ECM 402 and connects second portion 450b to open line 465. IVS 440 thus appears to be in its idle state.

Figure 5:
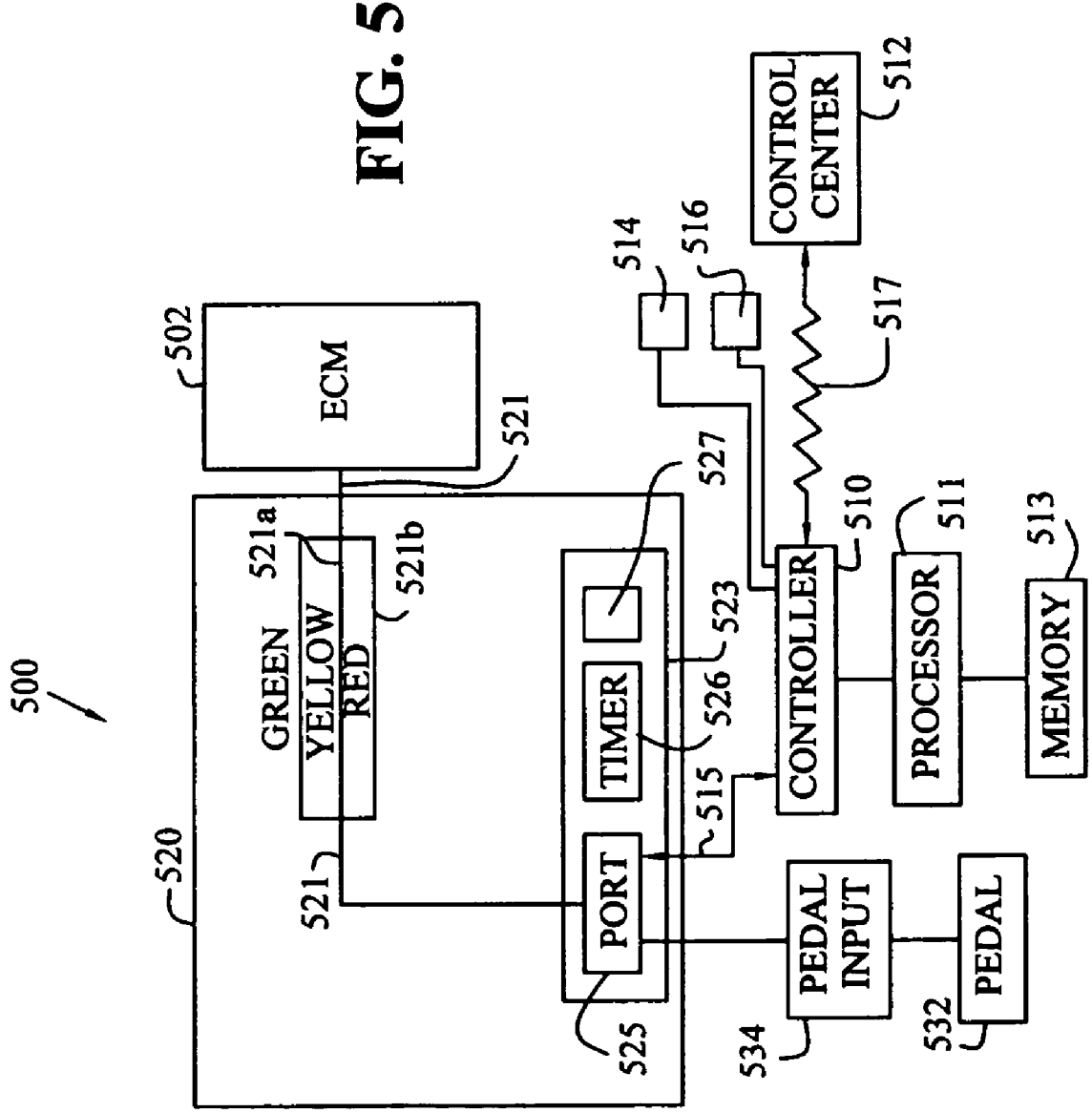
FIG. 5 is a block diagram of a vehicle disable system implementing the multi-stage degrade/disable controller of the present invention, the controller receiving pulse width modulation signals.

In another embodiment of the present invention, a method and controller may be used to degrade and/or disable a throttle. FIG. 5 illustrates a block diagram of vehicle disable system 500 in which controller 510 of the present invention is implemented and provided with a pulse width modulated ("PWM") signal. The two primary types of throttle position signals are PWM signals and analog voltage from potentiometers. While the PWM signal is digital and only takes a value from a finite set of predetermined possibilities (e.g., 0V, 5V), the analog voltage has a continuously varying value. The PWM signal also has a range of 0% to 100% duty cycles. The duty cycle is proportional to the pedal position, as provided by pedal input 534. A throttle position signal having a 10% duty cycle is on for 10% of the period and off the other 90%.

Referring to FIG. 5, controller 510 is shown as the main telematics controller and may be any number of computing platforms or controllers, including, e.g., TruckPC, a commercial fleet management tool built upon an open architectural platform and powered by the Microsoft Windows CE® operating system (WINDOWS CE is a registered trademark of Microsoft Corporation of Redmond, Wash.). Controller 510 may also be implemented as Onstar (ONSTAR is a registered trademark of General Motors Corporation of Detroit, Mich.), Lojack (LOJACK is a registered trademark of Lojack Corporation of Westwood Mass.), or other systems providing vehicle navigation functionality. Controller 510 includes processor 511 and memory 513, including random access memory and read only memory for the storage of data and program instructions, e.g., the instructions executed by controller 510 to control ILTC 520.

Controller 510 also includes GPS receiver functionality. Accordingly, controller 510 may receive GPS signals and translate those signals into vehicle position information. Vehicle position information may include a vehicle's global positioning coordinates as determined by the position of controller 510. In order for controller 510 to determine in which zone the vehicle is positioned, controller 510 may transmit the vehicle's location information via wireless communication link 517 to control center 512 in the form of a location report. Control center 512 may then compare the location report with the vehicle's preprogrammed route information. It is also conceived that the vehicle's preprogrammed route information may be wirelessly transferred to controller 510, which may be programmed to compare the route information with its present location to determine in which zone the vehicle is located.

In an exemplary embodiment of the present invention, controller 510 may include program instructions in memory 527 to be executed by processor 523 that enables controller 510 to appropriately interpret throttle position signals as they relate to the relevant predefined zones and appropriately command ILTC 520. In other forms of the present invention, the program instructions may be stored and executed using memory and processing devices located at control center 512 such that control center 512 can appropriately instruct ILTC 520. ILTC 520 includes processor 523 for carrying out the commands of controller 510, and processor 523 includes input capture timer port 525, timer 526 and memory 527.

Figure 6:
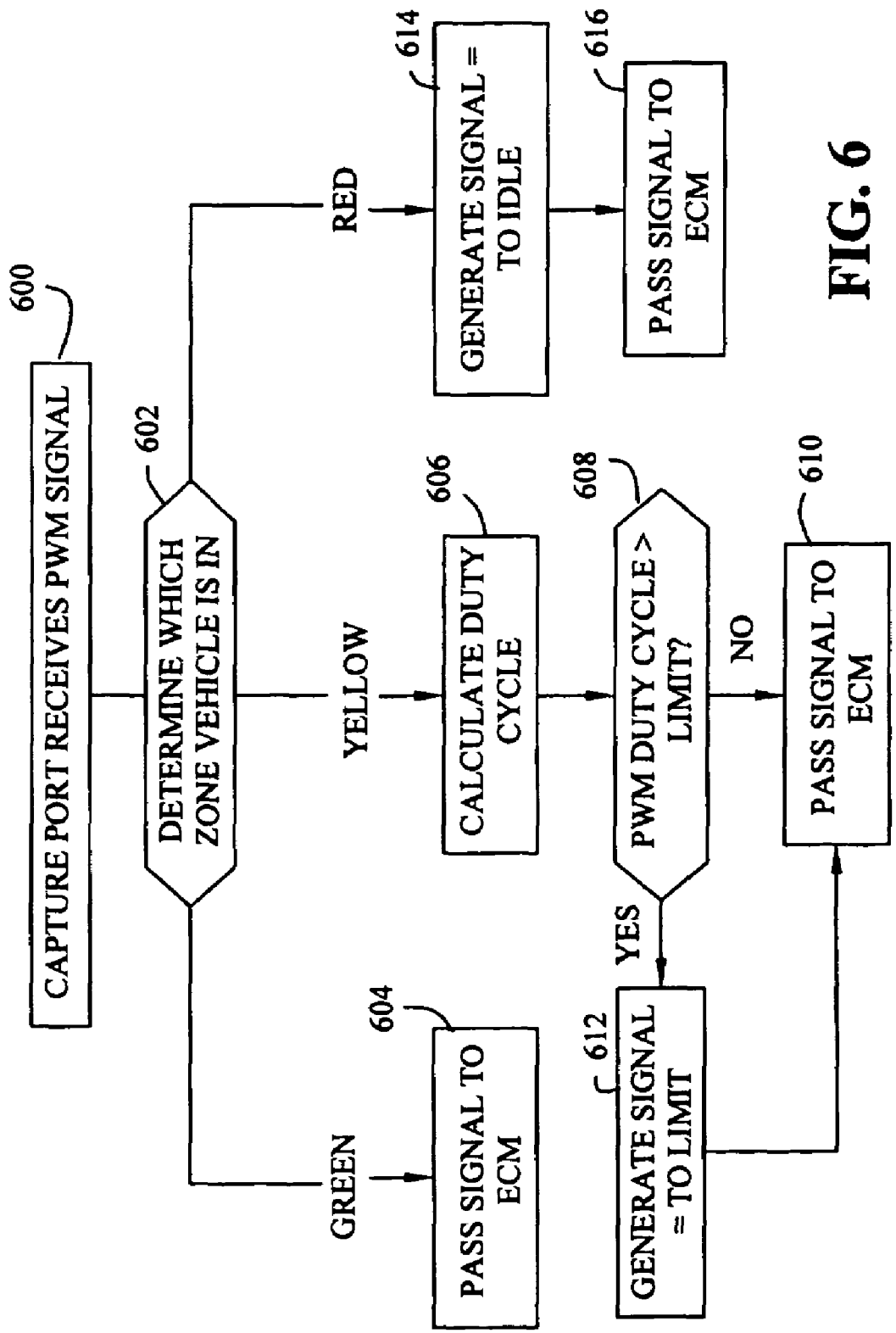
FIG. 6 is flowchart illustrating the degrading/disabling of a throttle when the controller receives pulse width modulation signals.

FIG. 5 will now be described in conjunction with FIG. 6 to explain an example of the degrade and disable functions of the present invention. As shown in FIG. 5, ILTC 520 receives a pedal input 534 from vehicle pedal 532 in the form of a throttle position signal. ILTC 520 receives the signal via input port 425 (step 600).

ILTC 520 next polls controller 510 to determine the vehicle's zone level (step 602). Zone levels may be defined by the user of the inventive system in order to provide a basis upon which the determination to degrade or disable the throttle may be made. While three (3) zone levels (i.e., a green, yellow and red) have been described supra in regards to the present invention, it is contemplated that many zone levels, or their functional equivalents, may be used. The "green" zone may have a broad scope of definitions depending on the needs of the entity implementing vehicle disable system 500. For example, as described above, a zone level may be defined to indicate a vehicle's geographic location. A zone level, however, may also be defined to indicate improper driver authentication. For instance, the driver of a vehicle may use biometric device 514 (e.g., facial or fingerprint recognition device) or other mechanism to authenticate the driver's identity before her use of a vehicle. If the authentication device indicates that the vehicle is being used by the wrong driver, a specified zone level may be defined that instructs the inventive system that the vehicle's throttle should be degraded or disabled. In yet another example, a zone level may be defined to indicate that a silent alarm has been triggered. The driver of a vehicle may also use key fob 516 or similar device during driver authentication to indicate that the driver is being hijacked. In such a case, the driver's use of the key fob could enable a silent alarm and a corresponding zone level may be defined that instructs the vehicle disable system to degrade or disable the vehicle's throttle.

In an exemplary embodiment of the present invention, zone levels are used to indicate the geographic location of a vehicle. The "green" zone indicates the predefined route which a vehicle is expected to follow. The "yellow" zone indicates that the vehicle is either getting too close to a predetermined prohibited location or too far from a predetermined specified route, and the "red" zone indicates that the vehicle is either dangerously close to a predetermined prohibited location or extremely far from a predetermined specified route. After controller 510 determines the vehicle's zone level, it transmits the zone level information to ILTC 520 over control line 515.

If the throttle position signal is a PWM signal and the vehicle is in the "green" zone, ILTC 520 transmits the PWM signal to ECM 502 over signal line 521 (step 604). If the vehicle is in the "yellow" zone, input capture port 525 calculates the signal's duty cycle (step 606) and determines whether the PWM signal has a duty cycle greater or less than a predefined "limit" (step 608). If the PWM signal has a duty cycle less than the predefined limit (e.g., a 45% duty cycle when the predetermined limit is a 50% duty cycle), then ILTC 520 passes the signal to ECM 502 over signal lines 521, 521*a* (step 610). If port 525 calculates the PWM signal to be greater than the predefined limit (e.g., a 60% duty cycle), then timer 526 generates a signal with a duty cycle fixed at the predetermined limit (50%) (step 612) and passes the fixed signal to ECM 502 via signal lines 521, 521*a* (step 610). If the vehicle is in the "red" zone, timer 526 generates a signal with the predetermined idle duty cycle (e.g., a 10% duty cycle) (step 614) and passes the signal to ECM 502 on lines 521, 521*b*.

Figure 7:
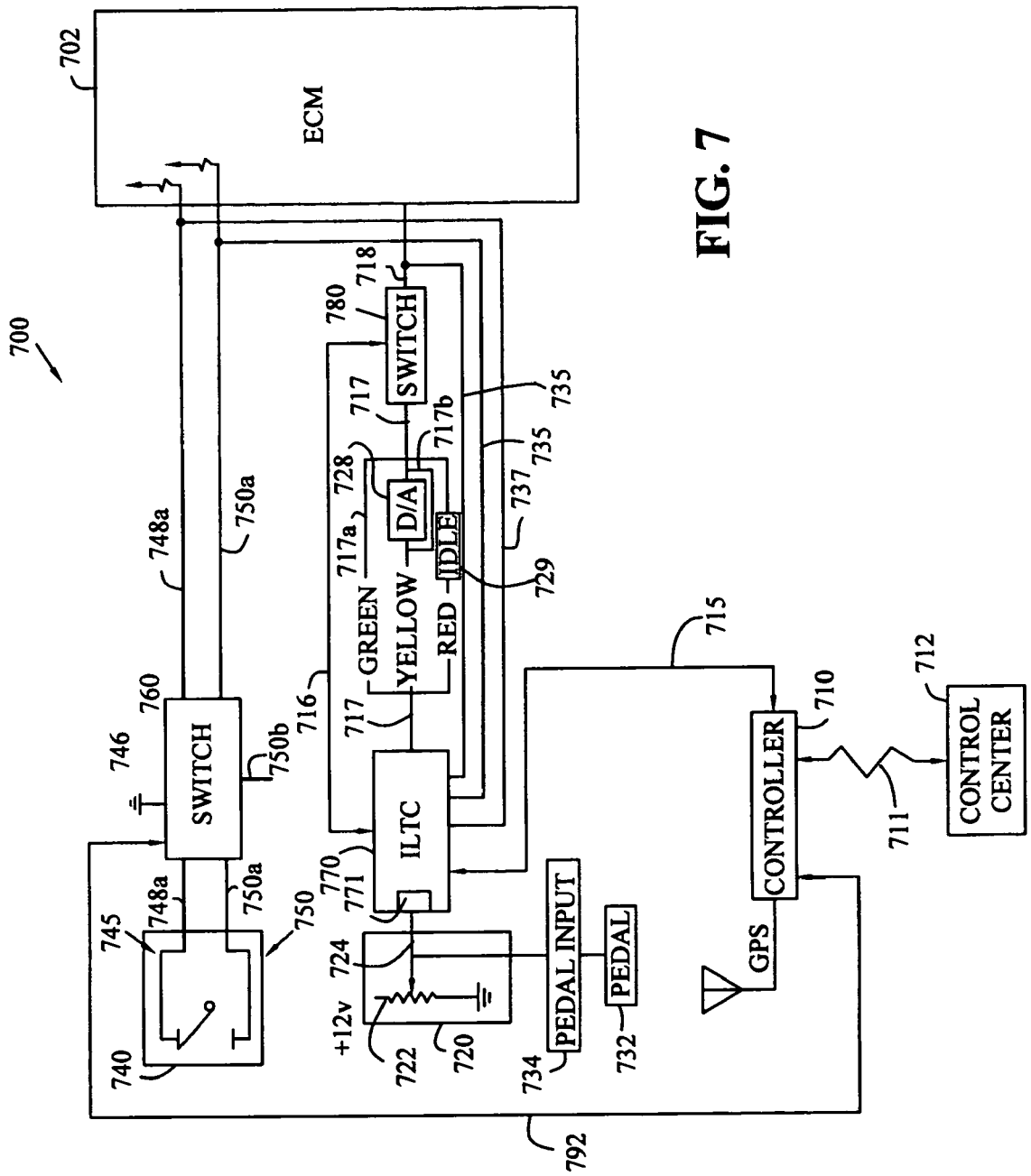
FIG. 7 is a block diagram of a vehicle disable system implementing the multi-stage degrade/disable controller of the present invention, the controller receiving analog signals.
Figure 8:
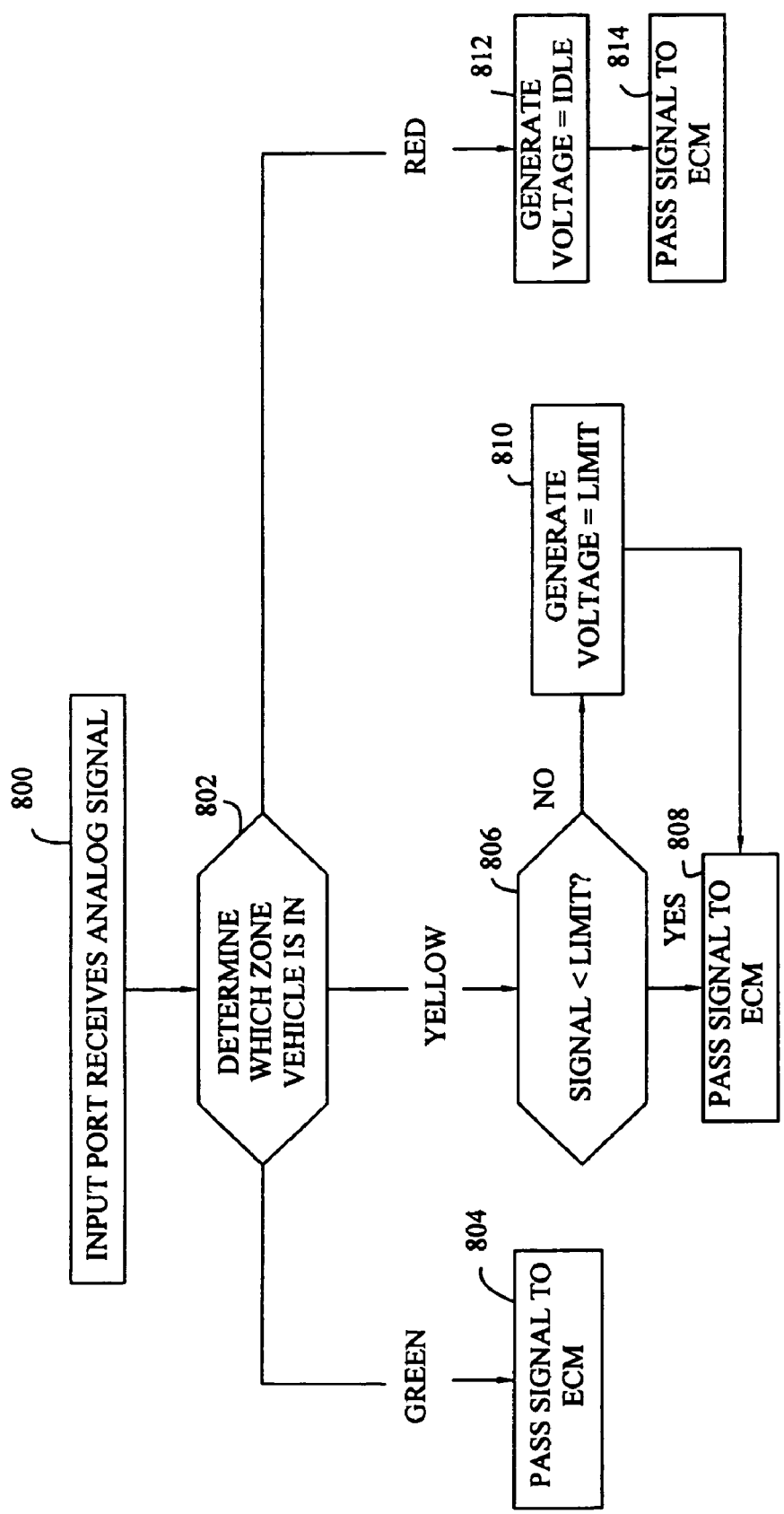
FIG. 8 is flowchart illustrating the degrading/disabling of a throttle when the controller receives analog throttle position signals.

FIG. 7 illustrates a block diagram of vehicle disable system 700 in which controller 770 of the present invention is implemented and provided with analog throttle position sensor signals. FIG. 7 will be described in conjunction with FIG. 8 to explain the method of the present invention. As shown in FIG. 7, ILTC 770 receives a pedal input 734 from vehicle pedal 732 in the form of a throttle position signal. ILTC 770 receives the signal via input port 771 (step 800). ILTC 770 then polls controller 710 to determine in which zone the vehicle is positioned (step 802). Controller 710 transmits the requested vehicle position information to ILTC 770 over control line 715.

If controller 710 determines that the vehicle is in the "green" zone, ILTC 770 passes the signal over lines 717, 717*a* to switch 780, which switches the signal to ECM 702 over line 718 (step 804). If controller 710 determines that the vehicle is in the "yellow" zone, input port 771 determines whether the signal has a voltage less than a predefined limit (step 806). If the signal is determined to have a voltage less than the limit, ILTC 770 transmits the signal to switch 780 via signal lines 717, 717*b*. Switch 780 then switches the signal to ECM 702 via signal line 718 (step 808). If port 771 determines that the signal has a voltage equal to or greater than the limit, then, ILTC 770 instructs signal generating device 728 to generate a voltage equal to the predefined limit (step 810), and this voltage is applied to signal line 717 and transmitted to switch 780, which switches the signal to ECM 702 (step 808). In an exemplary embodiment of the present invention, signal generating device 728 is an analog to digital converter. In other embodiments of the present invention, signal generating device 728 may be a potentiometer. If controller 710 determines that the vehicle is in the "red" zone, ILTC 770 instructs signal generating device 729 to generate a predetermined idle voltage (step 812), and this voltage is applied to signal line 717 and passed to ECM 702 (step 814).

It is also conceived that if controller 710 determines that the vehicle is in a "red" zone, control center 712 may indicate to controller 710 that the throttle needs to be forced to idle. Controller 710 may include program instructions that, when executed, enable it to instruct ILTC 770 to force the throttle to idle. It is further conceived that ILTC 770 may receive feedback voltages from signal lines 748a, 750a via lines 735, 736, 737 to verify that no tampering has occurred with vehicle disable system 700.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. In an automotive vehicle having an engine throttle under the control of an electronic control module ("ECM"), and a driver input mechanism indicating a state of the throttle varying between idle and non-idle operation, a method of reducing the throttle, the method comprising the steps of:
    receiving an input signal related to the state of the driver input mechanism, said input signal comprising one of an analog signal and a digital signal, said analog signal having a voltage and said digital signal having a duty cycle;
    interpreting said input signal; and
    at least one of degrading and disabling the throttle based on the interpretation of said input signal.

2. The method of claim 1 wherein said step of interpreting includes a step of determining whether the vehicle is in at least one of a first, a second and a third zone level.

3. The method of claim 2 wherein said step of determining includes a step of utilizing vehicle position information to determine whether the vehicle is in one of the first, second and third zone levels.

4. The method of claim 2 wherein said step of determining includes a step of utilizing alarm information to determine whether the vehicle is in one of the first, second and third zone levels.

5. The method of claim 2 wherein said step of determining includes a step of utilizing biometric information to determine whether the vehicle is in one of the first, second and third zone levels.

6. The method of claim 2 wherein, if said input signal is digital, said step of interpreting includes a step of determining whether the input signal's duty cycle is greater than a predefined limit duty cycle.

7. The method of claim 2 wherein, if said input signal is digital and the vehicle is determined to be in the first zone level, said step of interpreting includes a step of transmitting said digital input signal to the ECM.

8. The method of claim 6 wherein, if said input signal is digital and the vehicle is determined to be in the second zone level, said step of interpreting includes a step of transmitting said digital input signal to the ECM until the signal's duty cycle is determined to be greater than the predefined limit duty cycle.

9. The method of claim 8 wherein said step of degrading includes a step of limiting the digital input signal's duty cycle to the predefined limit duty cycle if the signal's duty cycle is determined to be greater than the predefined limit duty cycle.

10. The method of claim 2 wherein if said input signal is digital and the vehicle is determined to be in the third zone level, said step of disabling includes steps of generating an idling signal and transmitting said idling signal to the ECM.

11. The method of claim 2 wherein, if said input signal is analog, said step of interpreting includes a step of determining whether said analog input signal's voltage is greater than a predefined limit voltage.

12. The method of claim 2 wherein, if said input signal is an analog signal and the vehicle is determined to be in the first zone level, said step of interpreting includes a step of transmitting said analog throttle position signal to the ECM.

13. The method of claim 11 wherein, if said input signal is analog and the vehicle is determined to be in the second zone level, said step of interpreting includes a step of transmitting said analog input signal to the ECM until the input signal's voltage is determined to be greater than the predefined limit voltage.

14. The method of claim 11 wherein, if said analog input signal is determined to be greater than the predefined limit voltage, said step of degrading includes steps of generating a limiting voltage equal to the predefined limit voltage and transmitting said limiting voltage to the ECM.

15. The method of claim 2 wherein, if said input signal is analog and the vehicle is determined to be in the third zone level, said step of disabling includes steps of generating an idling voltage signal and transmitting said idling voltage signal to the ECM.

16. In an automotive vehicle having an engine throttle under the control of an electronic control module (ECM), a controller comprising:
    a processor; and
    memory readable by said processor and storing program instructions executable by said processor to perform method steps, said method steps comprising:
        receiving an input signal related to the state of a driver input mechanism, said input signal comprising one of an analog signal and a digital signal, said analog signal having a voltage and said digital signal having a duty cycle;
        interpreting said input signal; and
        at least one of degrading and disabling the throttle based on the interpretation of said input signal.

17. The controller of claim 16 wherein said program instructions include said step of interpreting including a step of determining whether the vehicle is in at least one of a first, a second and a third zone level.

18. The controller of claim 17 wherein said program instructions include said step of determining including a step of utilizing vehicle position information to determine whether the vehicle is in one of the first, second and third zone levels.

19. The controller of claim 17 wherein said program instructions include said step of determining including a step of utilizing alarm information to determine whether the vehicle is in one of the first, second and third zone levels.

20. The controller of claim 17 wherein said program instructions include said step of determining including a step of utilizing biometric information to determine whether the vehicle is in one of the first, second and third zone levels.

21. The controller of claim 17 wherein said program instructions include, if said input signal is digital, said step of interpreting including a step of determining whether said input signal's duty cycle is greater than a predefined duty cycle.

22. The controller of claim 17 wherein said program instructions include, if said input signal is digital and the vehicle is determined to be in the first zone level, said step of interpreting including a step of transmitting said digital input signal to the ECM.

23. The controller of claim 21 wherein said program instructions include, if said input signal is digital and the vehicle is determined to be in the second zone level, said step of interpreting including a step of transmitting said digital input signal to the ECM until the signal's duty cycle is determined to be greater than the predefined limit duty cycle.

24. The controller of claim 23 wherein said program instructions include, if said digital input signal's duty cycle is determined to be greater than the predefined limit duty cycle, said step of degrading including a step of limiting the digital input signal's duty cycle to the predefined limit duty cycle.

25. The controller of claim 17 wherein said program instructions include, if said input signal is digital and the vehicle is determined to be in the third zone level, said step of disabling including steps of generating an idling signal and transmitting said idling signal to the ECM.

26. The controller of claim 17 wherein said program instructions include, if said input signal is analog, said step of interpreting including a step of determining whether said analog input signal's voltage is greater than a predefined limit voltage.

27. The controller of claim 17 wherein said program instructions include, if said input signal is an analog signal and the vehicle is determined to be in the first zone level, said step of interpreting including a step of transmitting said analog throttle position signal to the ECM.

28. The controller of claim 26 wherein said program instructions include, if said input signal is analog and the vehicle is determined to be in the second zone level, said step of interpreting including a step of transmitting said analog input signal to the ECM until the input signal's voltage is determined to be greater than the predefined limit voltage.

29. The controller of claim 28 wherein said program instructions include, if said analog input signal is determined to be greater than the predefined limit voltage, said step of degrading including steps of generating a limiting voltage equal to the predefined limit voltage and transmitting said limiting voltage to the ECM.

30. The controller of claim 17 wherein said program instructions include, if said input signal is analog and the vehicle is determined to be in the third zone level, said step of disabling including steps of generating an idling voltage signal and transmitting said idling voltage signal to the ECM.

* * * * *